(12) United States Patent
Bourbiaux et al.

(10) Patent No.: US 9,477,009 B2
(45) Date of Patent: Oct. 25, 2016

(54) METHOD OF EVALUATING AND SELECTING AN ENHANCED OIL RECOVERY STRATEGY FOR FRACTURED RESERVOIRS

(71) Applicant: IFP Energies nouvelles, Rueil-Malmaison (FR)

(72) Inventors: Bernard Bourbiaux, Rueil Malmaison (FR); Andre Fourno, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 440 days.

(21) Appl. No.: 14/087,259

(22) Filed: Nov. 22, 2013

(65) Prior Publication Data

US 2014/0163939 A1 Jun. 12, 2014

(30) Foreign Application Priority Data

Dec. 12, 2012 (FR) ..................... 12 02893

(51) Int. Cl.
G06F 17/50 (2006.01)
G01V 99/00 (2009.01)
E21B 43/26 (2006.01)
E21B 49/00 (2006.01)

(52) U.S. Cl.
CPC ............ *G01V 99/005* (2013.01); *E21B 43/26* (2013.01); *E21B 49/00* (2013.01)

(58) Field of Classification Search
USPC .............................. 703/2, 5, 9; 166/369, 400
See application file for complete search history.

(56) References Cited

U.S. PATENT DOCUMENTS 5,503,226 A * 4/1996 Wadleigh ............. E21B 43/164
166/245

6,283,212 B1 * 9/2001 Hinkel ..................... C09K 8/64
166/279
8,408,313 B2 * 4/2013 Yale ....................... E21B 43/24
166/250.02

(Continued)

FOREIGN PATENT DOCUMENTS

| WO | WO 2010/138558 A2 | 2/2010 |
| WO | WO 2010/002680 A1 | 7/2010 |
| WO | WO 2011/159109 A3 | 12/2011 |

OTHER PUBLICATIONS

Civan, F., et al: "Parameters of Matrix/Fracture Immiscible-Fluids Transfer Obtained by Modeling of Core Tests", Jun. 2012 SPE Journal, Aug. 31, 2006, pp. 540-554, XP055081691.

(Continued)

*Primary Examiner* — Thai Phan
(74) *Attorney, Agent, or Firm* — Fitch, Even, Tabin & Flannery LLP

(57) ABSTRACT

The invention is a method of evaluating a recovery potential for hydrocarbons contained in a fractured reservoir, using an enhanced recovery technique. Characteristic reservoir data, data obtained from well test results and data relative to the development conditions are acquired. A pressure gradient related to the flow of a fluid injected to improve recovery is then estimated from the previously acquired data. A recovery coefficient is calculated for the hydrocarbons initially in place in matrix blocks by estimating water saturation for a state of equilibrium of the matrix blocks. Finally, the oil recovery time under the effect of the fluid circulation in fractures is estimated by determining the required for the matrix blocks to change from the initial state to a state of equilibrium.

32 Claims, 2 Drawing Sheets

(56) References Cited

U.S. PATENT DOCUMENTS

| | | | |
|---|---|---|---|
| 2006/0184346 A1* | 8/2006 | Panga | E21B 43/16 703/9 |
| 2009/0236103 A1* | 9/2009 | Yale | E21B 43/16 166/400 |
| 2010/0218954 A1* | 9/2010 | Yale | E21B 43/26 166/369 |
| 2013/0068462 A1* | 3/2013 | Pantano | E21B 43/25 166/305.1 |
| 2013/0124169 A1 | 5/2013 | Sung | |

OTHER PUBLICATIONS

Unsal, Evren, et al: "Simulation of Multiphase Flow in Fractured Reservoirs Using a Fracture-Only Model with Transfer Functions", Computation Geosciences, Kluwer Academic Publishers, DO, vol. 14, No. 4, Nov. 13, 2009, pp. 527-538, XP019816092, ISSN: 1573-1499.

Bourbiaux, B., et al: "A Rapid and Efficient Methodology to Convert Fractured Reservoir Images Into a Dual-Porosity Model", Oil & Gas Science & Technology: Revue de L'Institut Francais Du Petrole, Editions Technip. Paris, FR, vol. 53, No. 6, Nov. 1, 1998, pp. 785-799, XP000831340, ISSN: 1294-4475.

Dehghan, A. A., et al: "Investigating the Fracture Network Effects on Sweep Efficiency During WAG Injection Process", Transport in Porous Media, Kluwer Academic Publishers, DO, vol. 93, No. 3, Mar. 8, 2012, pp. 577-595, XP035067461, ISSN: 1573-1634, DOI: 10.1007/S11242-012-9970-7.

Reis, J.C.: "Oil Recovery Mechanisms in Fractured Reservoirs During Steam Injection", Paper SPE 20204, pp. 313-320, presented at the SPE/DOE EOR Conference, Apr. 22-25, 1990, Tulsa, OK.

Allan, Jack, et al: "Controls on Recovery Factor in Fractured Reservoirs: Lessons Learned from 100 Fractured Fields," Paper SPE 84590 presented at the 2003 SPE Ann. Tech. Conf. & Exh. Held in Denver, CO, USA, Oct. 5-8, 2003, pp. 1-17.

Pirker, Barbara, et al: "Numerically-Derived Type Curves for Assessing Matrix Recovery Factors," Paper SPE 107074 presented at the SPE Europec/EAGE Ann. Conf. & Exh. Held in London, UK, Jun. 11-14, 2007, pp. 1-13.

Gupta, R., et al: Parametric Study to Enhance Oil Recovery Rate from Fractured Oil=Wet Carbonate Reservoirs, Paper SPE 116485 presented at the 2008 SPE Ann. Tech. Conf. & Exh. Held in Denver, CO., USA, Sep. 21-24, 2008, pp. 1-11.

Bourbiaux, B.: "Understanding the Oil Recovery Challenge of Water Drive Fractured Reservoirs," Paper IPTC 13909 presented at the International Petroleum Technology Conference, Dec. 7-9, 2009, Doha, Qatar, pp. 1-16.

Legrand, Nicholas, et al: "Recovery Mechanisms and Oil Recovery from a Tight, Fractured Basement Reservoir, Yemen", SPE Reservoir Evaluation & Engineering, Aug. 2011. pp. 493-504.

* cited by examiner

US 9,477,009 B2

METHOD OF EVALUATING AND SELECTING AN ENHANCED OIL RECOVERY STRATEGY FOR FRACTURED RESERVOIRS

CROSS REFERENCE TO RELATED APPLICATION

Reference is made to French application Ser. No. 12/02.893, filed Dec. 12, 2012, which application is incorporated herein by reference in its entirety.

BACKGROUND OF THE INVENTION

1. Field of the Invention

The present invention relates to oil recovery from fractured reservoirs, the major part being contained in porous matrix blocks limited by fractures.

2. Description of the Prior Art

In the case of weakly water-wet or non-water-wet fractured reservoirs, water injection is often ineffective because the capillary forces retain the oil within the matrix blocks.

Adding a chemical additive to the injection water can then be considered in order to modify the interfacial properties of the water-oil-rock system, according to two potential procedures which are capillary force intensity reduction through water-oil interfacial tension reduction and restoration of capillary motive forces through wettability inversion of the rock, which becomes water wet again in the present case.

Injection of additives increasing the viscosity of the water injected can also be considered in order to increase the pressure gradient within the fluid circulating in the fractures and thus to carry along the oil in the matrix blocks through viscous effect.

In some cases, it is also possible to use another recovery method involving the injection of a gas alone or in combination with an aqueous phase and/or a chemical agent (alternate water/gas or foam injection for example).

However, selecting and implementing one among these many enhanced recovery methods first requires sufficient evaluation of the context of the reservoir being studied and of the effects of the production mechanisms being used.

This notably involves estimating the impact of the physical mechanisms likely to allow oil expulsion from the matrix blocks. That is, in the case of production by injection of a fluid (most often water) maintaining the pressure, (a) the gravity forces related to the presumed height of the blocks, (b) the forced (viscous) displacement within the blocks associated with the circulation of the fluid injected and/or produced in the fractures, and also in some cases (c) exchanges by diffusion caused by possible composition gradients between fracture and matrix. The expansion mechanism associated with the compressibility of the fluids and of the rock can also be involved if the pressure and/or the temperature of the reservoir vary during production. The capillarity forces are not mentioned as a recovery-promoting mechanism because the reservoirs concerned here are preferably oil wet, which are the most frequently encountered ones in a carbonate context.

Evaluation of these various recovery mechanisms, notably the gravitational effects and the viscous effects likely to compensate for the opposing effects of an unfavorable capillarity in the case of water injection in an oil-wet fractured medium, is essential for enabling the reservoir engineer to choose an enhanced recovery method that amplifies or restores the beneficial impact of one or the other of these mechanisms. It can notably be a chemical process comprising adding a chemical additive to the injection fluid that is most often based on water.

This prior evaluation allows, on the one hand, to select an enhanced recovery strategy and, on the other hand, to focus the means and efforts on the sizing and optimization of the method(s) meeting the requirements relative to the enhanced recovery strategy that is selected.

There are known methods of evaluating oil recovery in fractured oil fields. These methods are based on statistical, analytical, experimental and/or numerical approaches. Such methods are for example described in the following documents:

Reis, J. C.: "Oil Recovery Mechanisms in Fractured Reservoirs During Steam Injection", paper SPE 20204 presented at the SPE/DOE EOR Conference, 22-25 Apr. 1990, Tulsa, Okla.

Jack Allan and S. Qing Sun: Controls on Recovery Factor in Fractured Reservoirs: Lessons Learned from 100 Fractured Fields, paper SPE 84590 presented at the 2003 SPE Ann. Tech. Conf. & Exh. held in Denver, Co., USA, 5-8 Oct. 2003.

Barbara Pirker, Georg M. Mittermeir and Zoltan E. Heinemann: "Numerivally-Derived Type Curves for Assessing Matrix Recovery Factors", paper SPE 107074 presented at the SPE Europec/EAGE Ann. Conf. & Exh. held in London, UK, 11-14 Jun. 2007.

R. Gupta, B. Adibhatla and K. K. Mohanty: Parametric Study to Enhance Oil Recovery Rate From Fractured Oil-Wet Carbonate Reservoirs, paper SPE 116485 presented at the 2008 SPE Ann. Tech. Conf. & Exh. held in Denver, Co., USA, 21-24 Sep. 2008.

B. Bourbiaux: "Understanding the Oil Recovery Challenge of Water Drive Fractured Reservoirs", paper IPTC 13909 presented at the International Petroleum Technology Conference, 7-9 Dec. 2009, Doha, Qatar.

Nicolas Legrand, Joop de Kok, Pascale Neff, and Torsten Clemens, OMV E&P: "Recovery Mechanisms and Oil Recovery From a Tight, Fractured Basement Reservoir, Yemen", SPE Reservoir Evaluation & Engineering, August 2011.

Patent applications WO-10,002,680 and WO-10,138,558 relate to methods of evaluating an enhanced oil recovery technique.

However, all these methods require a large amount of data, which is sometimes difficult to obtain, and/or they generally use reservoir simulations. These methods are therefore long and complex to implement.

Furthermore, for typical fractured reservoirs, the problem of recovery arises specifically on the matrix block scale because these matrix blocks contain almost all of the oil and they are bypassed by the fractures.

SUMMARY OF THE INVENTION

The present invention is a method of evaluating the recovery potential of hydrocarbons contained in porous matrix blocks of a fractured reservoir, in order to further the selection of an enhanced recovery method suited to the context of the field being studied. The simplicity and the practical/realistic nature of the method is in the definition of one or more geometries of representative matrix blocks ((deduced from the geologic characterization of the fractures), the estimation of the flow conditions in the fractures deduced from the results (fracture network permeability) of well tests (a priori measurements always available), and finally the quantitative evaluation of the porous block recovery rates and kinetics, obtained by injection of a fluid circulating preferably in the fracture network limiting these blocks.

These orders of magnitude allow selection of an enhanced recovery strategy which is suited for the reservoir under consideration and then to target a recovery method that best uses this strategy.

The invention is in particular intended for fractured reservoirs whose recovery prognosis is in principle unfavorable, notably preferably oil-wet fractured reservoirs whose pressure is maintained through water injection. However, the method according to the invention applies whatever the (water or oil) wettability of the reservoir considered. This pre-selection is based on the results of a quantitative evaluation of the matrix-fracture exchanges from a minimum amount of information normally available and/or accessible to the reservoir engineer. This information results from conventional data characterization and acquisition stages that provide knowledge of the reservoir structure (including the presence or not of fractures), of the facies content (including the petrophysical properties of the matrix medium determined from logs and/or on cores), of the fluid content and of the flow behavior of the reservoir (identified by well tests).

In general terms, the invention relates to a method of evaluating a recovery potential for hydrocarbons contained in porous matrix blocks of a fractured reservoir, wherein the blocks are limited by fractures by using an enhanced recovery technique with a fluid being injected into the reservoir. The method comprises the following stages for at least one matrix block:

i) acquiring data characteristic of the reservoir obtained from well tests and data relative to development conditions of the reservoir;

ii) estimating a pressure gradient (Gx) related to a flow of the fluid in the fractures, from data acquired in i), iii) calculating a recovery coefficient (CR) for the hydrocarbons initially in place in the at least one block, by estimating a fluid saturation for a state of equilibrium of the at least one matrix block, from the pressure gradient (Gx) and from data acquired in i); and iv) estimating a hydrocarbon recovery time under an effect of a flow of the fluid in the fractures, by determining a time required for changing from an initial state to the equilibrium state of the matrix block, by applying two-phase displacement laws, from the pressure gradient (Gx) and from data acquired in i).

According to the invention, pressure gradient (Gx) can be estimated by use of the following data:

the Darcy velocity (u) of the fluid within said fracture;
the viscosity ($\mu$) of the fluid; and
the fracture permeability ($k_{test}$) obtained from a well test.

The water saturation at equilibrium can be calculated from the following data:

the density contrast of the displacing and displaced fluids;
the dip ($\alpha$) of the matrix block;
the pressure gradient ($G_x$); and
the matrix block dimension ($l_x$) in the direction of flow (x) in the fracture.

The oil recovery time can be estimated by use of the following data:

the fluid properties and the petrophysical properties of flow within the at least one matrix block, such as: matrix porosity and permeability, initial saturations, capillary pressures and relative permeabilities;

the matrix block dimension ($l_x$),
the flow conditions imposed in the fracture, that is the pressure difference ($\Delta p_w^f = G_x l_x$)); and
the final equilibrium saturation of the matrix blocks.

The invention also relates to an enhanced oil recovery method for hydrocarbons contained in porous matrix blocks of a fractured reservoir wherein the at least one block is limited by fractures, wherein a fluid is injected into the reservoir. The method comprises the following stages for at least one matrix block:

a) selecting a set of enhanced oil recovery strategies and, for each strategy:

b) determining a hydrocarbon recovery coefficient (CR) and a recovery time using the method according to the invention;

c) selecting the enhanced recovery strategy permitting obtaining a maximum hydrocarbon recovery coefficient (CR) for a minimum recovery time, d) implementing said selected strategy.

Finally, according to the invention, the enhanced recovery strategy can be selected from among the following strategies: increasing the pressure gradient (Gx); cancelling out the matrix capillarity; reverting the wettability of the matrix. The pressure gradient (Gx) can be increased by circulating a viscous fluid in the fractures. The matrix capillarity can be cancelled out by adding at least one chemical agent to the injection fluid. The wettability of the matrix can be reverted by adding at least one chemical agent to the injection fluid.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The method according to the invention provides an evaluation of a hydrocarbon recovery potential, that is the amount of hydrocarbons (oil for example) that can be extracted from porous blocks by injecting a sweeping fluid (enhanced recovery technique), as well as the time required for this extraction. This method can be used for selecting an enhanced recovery strategy for oil in place in a fractured reservoir.

Figure 1:
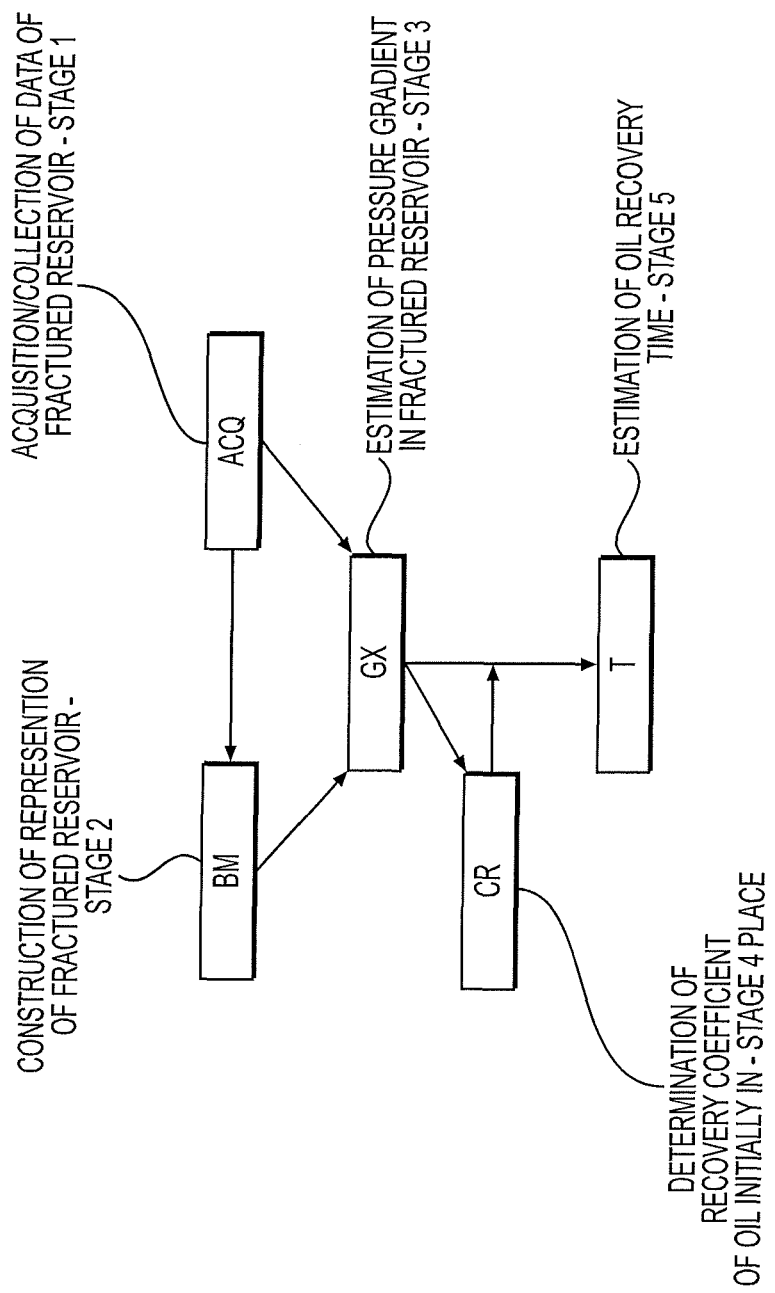
FIG. 1 diagrammatically shows various stages of the method according to the invention.

FIG. 1 diagrammatically shows the various stages of the method according to the invention:

1. Acquisition/collection of data characteristic of the fractured reservoir (ACQ)

2. Construction of a representation of the fractured reservoir (BM)

3. Estimation of the pressure gradient in the fracture network (Gx)

4. Determination of the recovery coefficient for the oil initially in place (CR)

5. Estimation of the oil recovery time (T).

The method is described in the particular case where the fluid injected is water.

1. Acquisition of Data Characteristic of the Fractured Reservoir

The data required for constructing a representation of the fractured reservoir are usually known at the end of the reservoir reconnaissance phase prior to the development thereof.

They notably comprise:

a) Data Characteristic of the Reservoir which are Fracturation Data

These data can be the characteristic dimensions (or lengths) of the matrix blocks. They are denoted by $l_i$ in direction i.

They are deduced from the average spaces between fractures and/or the spaces between discontinuities (cross joints for example) of the matrix medium.

matrix and fluid properties

These matrix properties can be selected from among permeability $k_m$, porosity, initial fluid saturations, capillary pressure curves and curves of relative permeability to the fluids present.

The fluid properties can be the viscosities and/or the densities.

fluid circulation conditions in the fractures

The data relative to the circulation conditions of the fluids in the fractures can be fluid velocities or flow rates.

b) Data Obtained from Well Test Results

These data can be permeabilities. Well test permeability $k_{test}$ allows attesting to the flow contrast between fractures and matrix (in the case of a fractured reservoir, $k_{test}$ is at least one order of magnitude greater than permeability $k_m$ of the matrix medium).

c) Data Relative to the Conditions of Development of the Reservoir

These data can be fluid velocities or flow rates.

For data comprising a certain dispersion, a value range can be collected instead of a mean value. This collection is achieved for each zone of the reservoir if it is heterogeneous as regards these fracturation and facies properties.

2. Construction of a Representation of the Fractured Reservoir

It is common practice in the profession to represent a fractured reservoir by a set of matrix blocks delimited by fractures.

The following document describes a method of constructing such matrix blocks:

Bourbiaux, B., Cacas, M. C., Sarda, S. and Sabathier, J. C. 1998, A Rapid and Efficient Methodology to Convert Fractured Reservoir Images into a Dual-Porosity Model, Revue de l'IFP, Vol. 53, No. 6, November-December 1998, 785-799.

These matrix blocks are then representative of the fractured reservoir considered under the usual or known reservoir development conditions.

Figure 2:
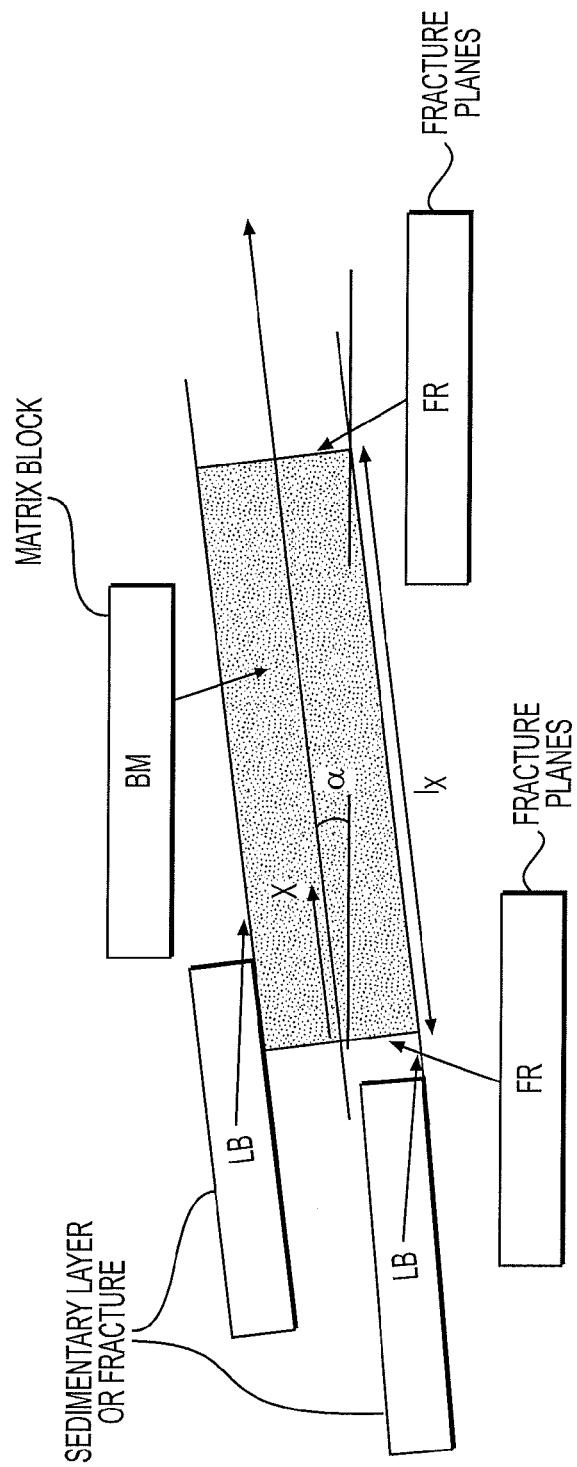
FIG. 2 is a schematized illustration of a matrix block (BM).

FIG. 2 is a schematized illustration of such a matrix block (BM). This porous block represents the rock of the reservoir. It is delimited above and below by the bed boundaries (sedimentary layer for example, or fracture) denoted by LB. This matrix block is laterally delimited by fracture planes (FR) interrupted or not by the bed boundaries. This block has a dip with respect to the horizontal. It is for example the dip of the sedimentary layer to which the matrix block belongs. This matrix block has a length $l_x$ in the direction of flow of the fluids denoted by X.

3. Estimation of the Pressure Gradient Related to the Flow in the Fracture Network The pressure gradient created by the fluid flow within the fractures that limit the matrix blocks is estimated from the data acquired in stage 1: it is the pressure variation per unit of fluid path through the fractures (unit equal to one mbar per meter for example). This gradient is denoted by $G_x$ in direction X: a pressure difference $\Delta P_f$ equal to $G_x l_x$ between the two ends of a representative block of length $l_x$ (the block dimensions resulting from stages 1 and/or 2) thus corresponds to gradient $G_x$.

This pressure gradient, also referred to as viscous pressure gradient, induces a displacement of the fluids saturating the matrix blocks that are evaluated in the next stages. Gradient $G_x$ is zero in the absence of flow within the fractures.

Darcy's law allows calculation of this pressure gradient as a function of the estimated velocity of the fluid circulating in the fractures, using the method described hereafter.

Concretely, in the case of reservoir exploitation through waterflooding for example, the development conditions include a typical progression velocity of the water within the reservoir, in accordance with the desired realistic displacement time between the injection well and the production well. This velocity, which is the ratio of the flow rate to the cross-section of the reservoir, is referred to as filtration velocity or Darcy velocity, and it is denoted by $u_x$ in direction of flow X. Darcy's law allows, by means of the acquired data, to relate this velocity to pressure gradient $G_x$ linked with the flow in the fracture as follows:

$$u_x = \frac{k_f}{\mu_w} G_x \approx \frac{k_{test}}{\mu_w} G_x$$

The desired pressure gradient is deduced therefrom:

$$G_x = \frac{\Delta P_f}{l_x} \approx \frac{\mu_w}{k_{test}} u_x$$

with:

$k_{test}$ is well test permeability (known at the end of stage 1)

$u_x$ is filtration velocity in direction X $\mu_w$ is viscosity of the displacing fluid (water for this example) injected.

The approximation $k_f \approx k_{test}$ is due to the fact that, for a fractured reservoir, the fracture permeability is always one or more orders of magnitude greater than the matrix permeability $k_m$.

Application

For the following data:

$\mu_w$=0.4 cp, $k_f \approx k_{test}$=100 md, and a Darcy velocity (in a uniformly swept supposedly homogeneous medium) equal to 0.03 m/day, A value is determined for the pressure gradient related to the flow in the fracture network equal to 14 mbar/m.

It is thus known, at the end of this stage, the pressure gradient prevailing in the fracture network.

4. Determination of the Recovery Coefficient CR for the Oil Initially in Place

The recovery coefficient (CR) of the oil initially in place in a matrix block is a ratio expressing the amount that can be extracted from a matrix block by injecting a sweeping fluid (water in our example). This amount can be expressed in fraction of the matrix block pore volume or in fraction of the volume of oil initially in place in the block.

The recovery coefficient is deduced from the matrix block equilibrium saturation obtained by circulation of the fluid in the surrounding fractures. We describe hereafter the production mechanism for the oil contained in the block prior to explaining the method of calculating said equilibrium saturation.

The flow in the fractures initiated by the injection of water induces a displacement of the oil saturating the matrix blocks and an expulsion of this oil into the fractures, where it is carried along to the production wells by the circulating water stream. This oil production that stops after some time leads to a state of equilibrium of the block where the fluid distribution (i.e. the local water and oil saturations) no longer varies over time at any point of the block. The difference between the average water saturation of the block that has reached this state of equilibrium and its average initial saturation prior to water injection corresponds to the oil recovery (expressed in fraction of the pore volume). If $S_{wi}$ is the average initial saturation of the block and $\overline{S_{weq}}$ is its average saturation at equilibrium, the oil recovery thus is $\overline{S_{weq}} - S_{wi}$ (in fraction of the matrix block pore volume) or $$\frac{\overline{S_{weq}} - S_{wi}}{1 - S_{wi}}$$

in fraction of the oil initially in place in the block. We explain below how to estimate the equilibrium saturation $\overline{S_{weq}}$.

This equilibrium calculation takes into account, on the one hand, the capillary properties of the matrix and of the fracture, and the density contrast of the displacing and displaced fluids (data resulting from stage 1), and on the other hand the viscous pressure drop applied to the block (obtained in stage 3) due to the fluid flow in the fractures.

Concretely, in the one-dimensional case, if the diagram of the representative block as illustrated in FIG. 2 is used, the equilibrium saturation at any point of abscissa x then, can be determined by integration along the block of length $l_x$ (length known from stages 1 and/or 2), the average saturation of the matrix block at equilibrium, from which the final oil recovery that can thus be obtained through fluid(s) circulation in the fractures is deduced. A two-dimensional similar calculation (integrated on the height of the block) can be carried out for higher precision.

In the case of water injection, the equilibrium saturation on abscissa x of the block can be evaluated using the analytical formula as follows (written in one dimension):

$$\boxed{S_{weq}(x) = S_w \left\{ p_c^m = \left[ -\frac{\Delta p_w^f}{l_x} - (\rho_w - \rho_o)g\sin(\alpha) \right](l_x - x) \right\}}$$

where $$\frac{\Delta p_w^f}{l_x}$$

is equal to pressure gradient $G_x$ determined in stage 3 and $\alpha$ is the dip (angle of inclination to the horizontal) of the blocks (known in stage 1).

$S_{weq}(x)$ is obtained by reversed reading of the capillary pressure curve of the matrix $p_c^m(S_w)$ (known in stage 1) for the capillary pressure value equal to $$-\frac{\Delta p_w^f}{l_x}(l_x - x) = (\rho_w - \rho_o)g\sin(\alpha)(l_x - x)$$

representing the respective contributions of the viscous pressure gradient within the fracture (estimated in stage 3) and of the gravitational pressure. The fracture capillary pressure is here assumed to be negligible because this approximation is frequent in practice, it can however be integrated in this calculation.

By integration of 0 to $l_x$, the average equilibrium saturation of the block $\overline{S_{weq}}$ is obtained:

$$\overline{S_{weq}} = \frac{1}{l_x} \int_0^{l_x} S_w(X) dX,$$

from which we deduce the recovery coefficient (CR), that is the relative amount of oil that can be obtained through fluid(s) circulation in the fractures.

5. Estimation of the Oil Recovery Time (T)

In this stage, the time required for the matrix block to change from the initial state to the state of equilibrium is estimated, that is the time required for recovery of the oil from the block that can be mobilized under the effect of the water circulation in the fractures.

The recoverable oil amount is estimated in stage 4. It is equal to $\overline{S_{weq}} - S_{wi}$ in fraction of the matrix block pore volume.

The recovery time is estimated by applying known two-phase displacement laws using the following data:

the fluid properties and the petrophysical properties of two-phase flow within the matrix (notably the matrix permeability, the capillary pressure and relative permeability curves from stage 1), the flow conditions in the fractures, known at the end of stages 1 and 3, the final equilibrium saturation of the matrix blocks representative of the reservoir, obtained in stage 4.

For example, in the case of water injection, the total time of displacement T of the displaceable oil of a matrix block of length $l_x$ can be estimated using the analytical formula as follows:

$$\boxed{T = \frac{\phi_m(\overline{S_{weq}} - S_{wi})\left(\frac{\mu_w}{kr_w(\overline{S_{weq}})} + \frac{\mu_o}{kr_{omax}}\right)l_x^2}{2k_m\left[\Delta p_w^f + P_c(\overline{S_{weq}}) + \Delta\rho g \frac{l_x}{2}\sin(\alpha)\right]}}$$

by means of the (matrix) data relative to the porosity $\Phi_m$, the permeability $k_m$, the capillary pressure $P_c$ and the relative permeabilities $kr_w$, $kr_o$ to the fluids saturating the matrix medium (data obtained in stage 1), the fluid data (viscosities ($\mu_w$, $\mu_o$) and density contrast ($\Delta\rho$ of the two fluids, also obtained in stage 1), the block length $l_x$ (datum obtained in stage 1 and/or 2), the pressure difference $\Delta p_w^f = G_x l_x$ related to the flow within the fractures (with $G_x$ obtained in stage 3), and finally the initial saturation values ($S_{wi}$ obtained in stage 1) and the equilibrium saturation values ($\overline{S_{weq}}$ obtained in stage 4) of the block.

This estimation of displacement time T is in practice carried out for values of $l_x$ contained in the range of block dimensions characterized and modelled at the end of stages 1 and/or 2.

Application of the Method: Selection of an Enhanced Recovery Strategy

This selection is achieved by analyzing the estimation of the recovery level (CR) and of the time (T) required for its production, representative of each zone of the reservoir being studied, obtained by carrying out stages 1, 2, 3, 4, 5 of the method according to the invention.

Stages 4 and 5 of the method are therefore repeated by varying different operating parameters furthering the selection of a recovery strategy, which strategy can for example (non exclusively) be:

increasing the pressure gradient imposed by the fracture flow, which can in practice be achieved by circulating a viscous fluid in the fractures;

cancelling out the matrix capillarity (responsible for oil retention in the matrix blocks in the case of preferably oil-wet fractured reservoirs), which can in practice be achieved by adding at least one specific chemical agent (surfactant, alkaline agent, etc.) to the injection fluid, reverting the wettability of the matrix (expressed by the sign change of the matrix capillary pressure), which can in practice also be achieved by adding at least one specific chemical agent (surfactant, alkaline agent, etc.) to the injection fluid.

The recovery levels and the production times of the matrix block representative of each zone of the reservoir being studied, estimated according to the invention, eventually allow the operating engineer to select the most promising recovery strategy determined by the (recovery-production time) pair providing the best technical and economic compromise.

Once a recovery strategy has been selected, the surveys required for implementing this strategy can start. They now afford the advantage of being focussed on the method or some recovery methods meeting the requirements relative to the recovery strategy selected. For example, on the basis of the aforementioned strategies, the implementation can be, in a non-exhaustive manner:

sizing (product concentration, flow rate, injection scheme, etc.) a method of injecting a polymer solution increasing the pressure gradient within the fracture network, similarly sizing a method of injecting a surfactant solution reducing the water-oil interfacial tension or reverting the wettability of the matrix; and sizing suitable combinations of such methods.

In practice, sizing is applied to various operating parameters such as the product concentration, the injection flow rate, the injection scheme (architecture and spacing/layout of the injection and production wells), the selection of the values of these parameters involving the simulation of the method(s) selected using numerical models constructed on scales ranging from the scale of the representative matrix block to that of the entire reservoir to the representative reservoir section and/or the pilot scale if necessary.

The invention also relates to an enhanced recovery method for hydrocarbons contained in porous matrix blocks of a fractured reservoir. This method comprises the following stages for at least one matrix block:

a) selecting a set of enhanced oil recovery strategies; and, for each strategy:

b) determining a hydrocarbon recovery coefficient (CR) and a recovery time using the method according to the invention, c) selecting the enhanced recovery strategy allowing maximizing the hydrocarbon recovery coefficient (CR) with a minimum recovery time, d) implementing the selected strategy.

The invention claimed is:

1. A method of evaluating a recovery potential of hydrocarbons contained in porous matrix blocks of a reservoir limited by fractures, using a recovery technique wherein a fluid is injected into the reservoir, for at least one matrix block comprising:

i) acquiring data characteristic of the reservoir, data obtained from well tests and data relative to development conditions of the reservoir;

ii) estimating a pressure gradient related to a flow of the fluid in the fractures, from data acquired in i), iii) calculating a recovery coefficient for the hydrocarbons initially in place in the at least one block, by estimating a fluid saturation for a state of equilibrium of the a least one matrix block, from the pressure gradient and from data acquired in i); and iv) estimating a hydrocarbon recovery time under an effect of flow of the fluid in the fractures by determining a time required for changing from an initial state to an equilibrium state of the matrix block, by applying two-phase displacement laws, from the pressure gradient and from data acquired in i).

2. A method as claimed in claim 1, wherein the pressure gradient is estimated by using:

Darcy velocity of the fluid within the fractures, viscosity of the fluid, and fracture permeability obtained from a well test.

3. A method as claimed in claim 1, wherein water saturation at equilibrium is calculated by using:

density contrast of displacing and displaced fluids, a dip of the at least one matrix block, the pressure gradient, and a matrix block dimension in a direction of flow in the fracture.

4. A method as claimed in claim 2, wherein water saturation at equilibrium is calculated by using:

density contrast of displacing and displaced fluids, a dip of the at least one matrix block, the pressure gradient, and a matrix block dimension in a direction of flow in the fractures.

5. A method as claimed in claim 1, wherein hydrocarbon recovery time is determined by using:

fluid properties and petrophysical properties of flow within the at least one matrix block, including matrix porosity and permeability, initial saturations, capillary pressures and relative permeabilities;

a matrix block dimension, a pressure difference of flow conditions imposed in the fractures, and final equilibrium saturation of the at least one matrix block.

6. A method as claimed in claim 2, wherein hydrocarbon recovery time is determined by using:

fluid properties and petrophysical properties of flow within the at least one matrix block, including matrix porosity and permeability, initial saturations, capillary pressures and relative permeabilities;

a matrix block dimension, a pressure difference of flow conditions imposed in the fractures, and final equilibrium saturation of the at least one matrix block.

7. A method as claimed in claim 3, wherein hydrocarbon recovery time is determined by using:

fluid properties and petrophysical properties of flow within the at least one matrix block, including matrix porosity and permeability, initial saturations, capillary pressures and relative permeabilities;

a matrix block dimension, a pressure difference of flow conditions imposed in the fractures, and final equilibrium saturation of the at least one matrix block.

8. A method as claimed in claim 4, wherein hydrocarbon recovery time is determined by using:

fluid properties and petrophysical properties of flow within the at least one matrix block, including matrix porosity and permeability, initial saturations, capillary pressures and relative permeabilities;

a matrix block dimension, a pressure difference of flow conditions imposed in the fractures, and final equilibrium saturation of the at least one matrix block.

9. A method in accordance with claim 1 comprising:

selecting a set of oil recovery strategies and for each strategy determining a hydrocarbon recovery coefficient and a recovery time, selecting the recovery strategy for obtaining a maximum hydrocarbon recovery coefficient for a minimum recovery time, and implementing the selected strategy.

10. A method in accordance with claim 2 comprising:

selecting a set of oil recovery strategies and for each strategy determining a hydrocarbon recovery coefficient and a recovery time, selecting the recovery strategy for obtaining a maximum hydrocarbon recovery coefficient for a minimum recovery time, and implementing the selected strategy.

11. A method in accordance with claim 3 comprising:

selecting a set of oil recovery strategies and for each strategy determining a hydrocarbon recovery coefficient and a recovery time, selecting the recovery strategy for obtaining a maximum hydrocarbon recovery coefficient for a minimum recovery time, and implementing the selected strategy.

12. A method in accordance with claim 5 comprising:

selecting a set of oil recovery strategies and for each strategy determining a hydrocarbon recovery coefficient and a recovery time, selecting the recovery strategy for obtaining a maximum hydrocarbon recovery coefficient for a minimum recovery time, and implementing the selected strategy.

13. A method as claimed in claim 9, wherein the recovery strategy is selected from:

increasing the pressure gradient;

cancelling a matrix block capillarity; and reverting a matrix block wettability.

14. A method as claimed in claim 13, comprising:

increasing the pressure gradient by circulating a viscous fluid in the fractures;

cancelling out the matrix capillarity by adding at least one chemical agent to the injection fluid; and reverting matrix wettability by adding at least one chemical agent to a fluid which is injected.

15. A method as claimed in claim 1, wherein a data characteristic of the reservoir is selected from fracturation data, matrix and fluid properties and fluid circulation conditions in the fractures.

16. A method as claimed in claim 2, wherein a data characteristic of the reservoir is selected from fracturation data, matrix and fluid properties and fluid circulation conditions in the fractures.

17. A method as claimed in claim 3, wherein a data characteristic of the reservoir is selected from fracturation data, matrix and fluid properties and fluid circulation conditions in the fractures.

18. A method as claimed in claim 5, wherein a data characteristic of the reservoir is selected from fracturation data, matrix and fluid properties and fluid circulation conditions in the fractures.

19. A method as claimed in claim 9, wherein a data characteristic of the reservoir is selected from fracturation data, matrix and fluid properties and fluid circulation conditions in the fractures.

20. A method as claimed in claim 13, wherein a data characteristic of the reservoir is selected from fracturation data, matrix and fluid properties and fluid circulation conditions in the fractures.

21. A method as claimed in claim 15, wherein the fracturation data includes dimensions characteristic of the at least one matrix block and is deduced from average spaces between at least one of the fractures and spaces between discontinuities of the matrix medium.

22. A method as claimed in claim 15, wherein matrix properties are selected from permeability, porosity, initial fluid saturations, capillary pressure curves and curves of relative permeability of fluids which are present.

23. A method as claimed in claim 21, wherein matrix properties are selected from permeability, porosity, initial fluid saturations, capillary pressure curves and curves of relative permeability of fluids which are present.

24. A method as claimed in claim 15, wherein the fluid properties are at least one of viscosities and densities.

25. A method as claimed in claim 21, wherein the fluid properties are at least one of viscosities and densities.

26. A method as claimed in claim 22, wherein the fluid properties are at least one of viscosities and densities.

27. A method as claimed in claim 15, wherein data relative to fluid circulation conditions in the fractures are fluid velocities or flow rates.

28. A method as claimed in claim 21, wherein data relative to fluid circulation conditions in the fractures are fluid velocities or flow rates.

29. A method as claimed in claim 22, wherein data relative to fluid circulation conditions in the fractures are fluid velocities or flow rates.

30. A method as claimed in claim 24, wherein data relative to fluid circulation conditions in the fractures are fluid velocities or flow rates.

31. A method as claimed in claim 1, wherein the data obtained from well test results are permeabilities.

32. A method as claimed in claim 1, wherein the data relative to development conditions of the reservoir are fluid velocities or flow rates.

* * * * *